METHOD FOR DYNAMIC CONTROLLING OF MAGNETIC CORE REGISTER

Filed May 8, 1968 4 Sheets-Sheet 1

INVENTORS

BY Akira Yokoyama, Harumasa Ueya, Yoshinori Yoshimune, Kobuhiro Tomabechi, Fotho Imai Attorney INVENTORS
Akira Yokoyama
Harumasa Ueya
Toshikuni Yoshizumi
Hidehiro Tanabashi
Toshio Arai
BY
[signature]
Attorney INVENTORS
Akira Yokoyama
Kazunaga Ueya
Toshihiko Yoshinuma
Kohichiro Tomabechi
Yoshio Imai
BY
[signature]
Attorney

INVENTORS
BY

United States Patent Office 3,546,679

Patented Dec. 8, 1970

3,546,679

METHOD FOR DYNAMIC CONTROLLING OF MAGNETIC CORE REGISTER

Akira Yokoyama, Harunaga Neya, Yoshinori Yoshimune, Nobuhiro Tomabechi, and Toshio Imai, Kawasaki-shi, Japan, assignors to The General Corporation, Kawasaki-shi, Japan

Filed May 8, 1968, Ser. No. 727,506

Int. Cl. G11c *7/00*

U.S. Cl. 340—172.5 2 Claims

ABSTRACT OF THE DISCLOSURE

A method for dynamic controlling of magnetic core register comprising the steps of: preparing the digit drive circuit which drives only the required unit of each register, and the register drive circuit which drives only the fixed register for selecting of the required unit of the needed register, operating the selection of the digit drive circuit by one ring counter stepping in synchronization with digit-selecting digit pulses having a constant period, preparing the counters for digit-selecting, setting the counters at fixed position by the standard timing of the digit pulse, putting the digit pulse into the counters as an input, and working the register drive circuits by the outputs of the counters.

The present invention relates to a controlling method of digit selecting of magnetic core registers.

The arithmetic operations are operations consisting of transformations performed between numerals stored in two registers in order to obtain a third numeral, and its most basic operation is accumulation. Although a magnetic core register is a very reliable and very cheap register, it does not function as an accumulator itself. Therefore, in the arithmetic operation between magnetic core registers, it has been customary to read out the contents of magnetic core registers on the other accumulatable registers, and after the arithmetic operation has been completed the result is written into one of the magnetic core registers.

Although there is a method in which whole digits of the contents of a magnetic core register are concurrently read out and processed, it is very expensive. For small size calculating devices, such as desk calculators, it is desirable that the digits of the contents of a magnetic core register are successively read out one by one for the operation. Since the numerals are generally mixed numbers, the digits of two registers to be read out do not always correspond to each other. Therefore, it is necessary to employ two ring counters in order to control the digit selecting of each register.

In order to reduce the number of drive circuits, a magnetic core register is generally furnished with the digit drive circuit which drives the appointed digit of each register and the register drive circuit which drives only the appointed register, and the so-called current coincidence method is employed, in which the appointed digit of the appointed register is read out by driving both the circuits. In this method, since one set of digit drive circuits and two sets of ring counters are employed, the connection between the required ring counter and the digit drive circuits only has to be switched over at the same time with the selecting of the register. However, the switch-over is not easy because of a great number of connecting lines.

It is an object of the present invention to provide a simplified method for selecting desired digits of two registers without switching over the connection between a ring counter and a digit drive circuit.

It is another object of the present invention to obtain an inexpensive calculating device by applying this method to implify the circuits.

With these and other objects in view, which will become apparent in the following detailed description, the present invention will be clearly understood in connection with the accompanying drawings, in which.

The method provided in order to realize the object of the present invention is called the dynamic controlling method, in which it is no longer necessary to switch over the connection between the ring counters and the digit drive circuits because it is possible to employ only one set of ring counters by shifting the timing of the digit driving and the register driving in accordance with the contents of the ring counters.

There are several methods for dynamic controlling of a magnetic core register, two of which will be described herein.

One of the methods is the process in which an N-progress ring counter is provided exclusively for the digit driving, and the digit of the register is appointed by the simple N-progress counters.

Figure 1:
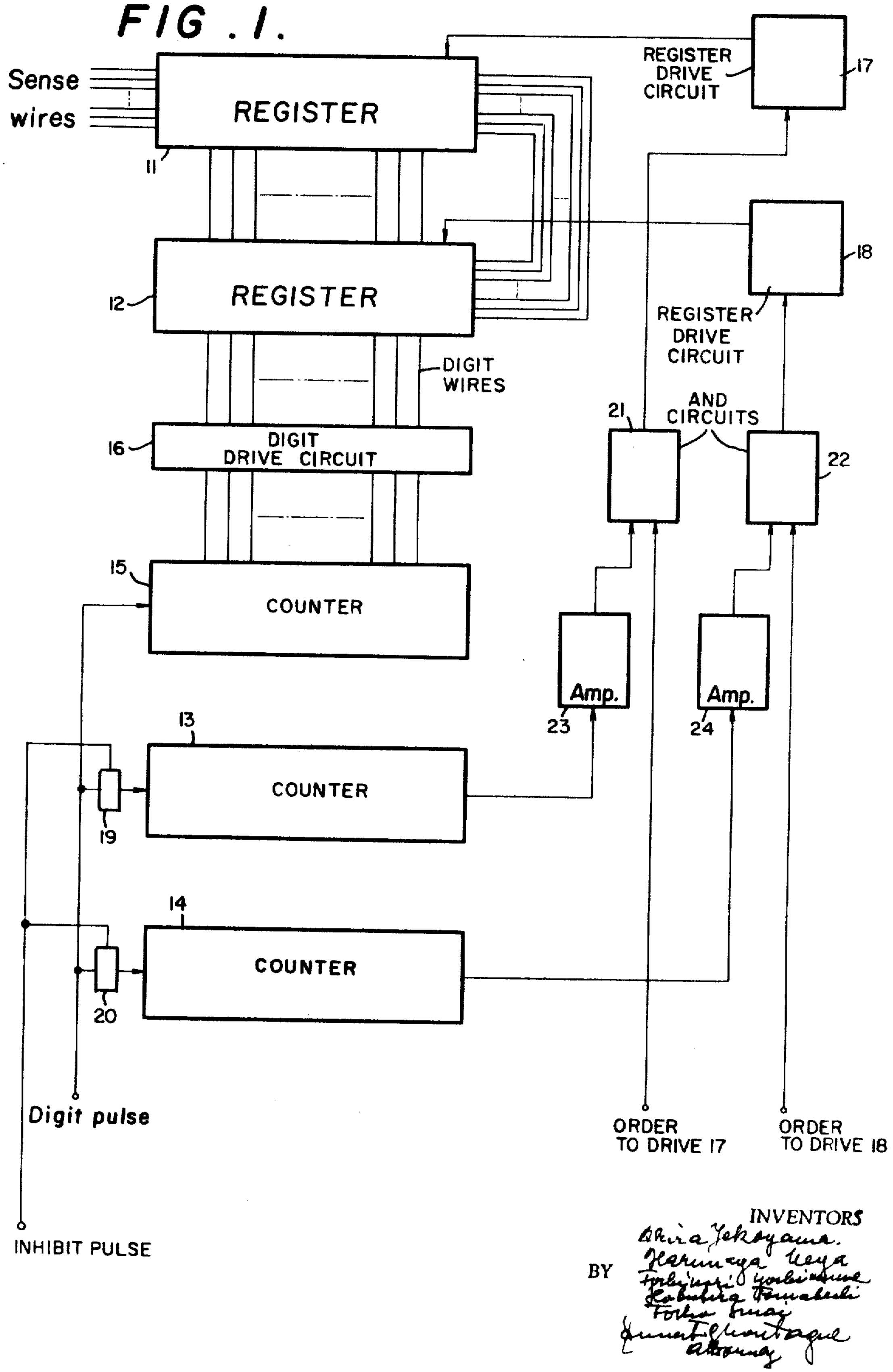
FIG. 1 is a block diagram showing the dynamic controlling method in the present invention.

Referring now to the drawings, and more particularly to FIG. 1, register 11 is connected to register 12, which in turns is connected to a digit drive circuit 16. The latter is connected to a ring counter 15. A counter 13 feeds to a buffer amplifier 23 and a counter 14 feeds to a buffer amplifier 24. Register drive circuits 17 and 18 are provided which receive signals from AND circuits 21 and 22, respectively, which in turn are connected to the amplifiers 23 and 24, respectively.

The appointment of two digits in the register 11 and the register 12 is performed by counters 13 and 14. The ring counter 15 is connected with the digit drive circuit 16 and the register digits are successively driven and switched over synchronously with the digit pulse. The counters 13 and 14 are set by proper values at the 0 timing of the digit pulse, that is, at the timing when the ring counter 15 selects the right end of the registers 11 and 12, and the digit pulse is supplied as an input thereto. Then either the register drive circuit 17 which feeds to register 11 or the register drive circuit 18 which feeds to register 12 is triggered by the output through the buffer amplifiers 23 and 24, and also through the AND circuits 21 and 22. Namely, the counters 13 and 14 are dynamic registers.

Figure 2:
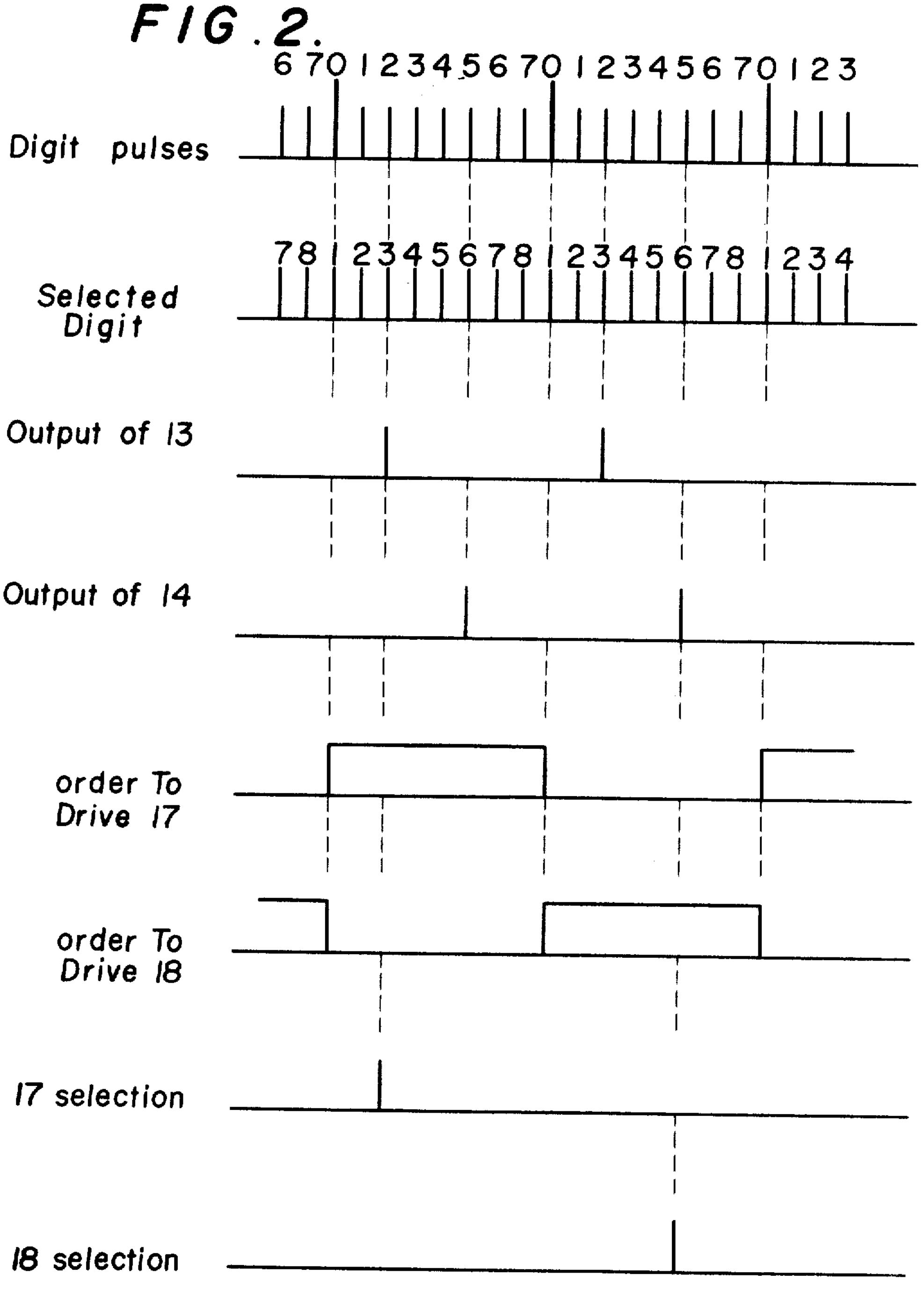
FIG. 2 is a time chart in which the 3rd digit of one register and the 6th digit of the other register are appointed when the registers have eight units in FIG. 1.

Referring now to the drawings, and more particularly to FIG. 2, an explanation is provided for the case where the register 11 and the register 12 have eight units. In addition, for example, let the contents of the register 11 be

| | | | | | | | |
|---|---|---|---|---|---|---|---|
| | | | | 1. | 2 | 3 | 4 |

and the contents of the register 12 be

| | | | | | | | |
|---|---|---|---|---|---|---|---|
| 5 | 6. | 7 | 8 | 9 | | | |

then the contents of the 4th digit of the register 12 is added to the contents of the 1st digit of the register 11, and the contents of the 5th digit of the register 12 is added to the contents of the 2nd digit of the register 11, and so on.

Now if the contents of the counter 13 is 5 and the contents of the counter 14 is 2, the counter 13 produces the output at the 8−5=3 timing, and the output of the counter 14 is produced at the 8−2=6 timing.

Accordingly, when the register drive circuit 17 is driven during the period from 0 timing to next 0 timing, that is during one cycle or working period of the digit pulses, the 3rd digit of the register 11 is selected at the 3 timing, and when the register circuit 18 is driven during said one working period, the 6th digit of the register 12 is selected at the 6 timing.

In this method, the selection of the digit is constantly carried out in the same direction from the lower unit toward the higher unit. Accordingly, there is a difference between the counters 13 and 14 in the timing when the output is produced depending on the contents. However, since it is usually convenient to determine the sequence in which the registers 11 and 12 are read out, the register drive circuits 17 and 18 are switched over every single working period, as shown in FIG. 2. Consequently, the two registers need two working periods, respectively, for reading out and writing.

The foregoing is the description of the method for selecting the 3rd digit of the register 11 and the 6th digit of the register 12. When one of the digit pulses to be supplied to the counters 13 and 14 is inhibited by means of inhibit circuits 19 and 20 feeding to counters 13 and 14, respectively, immediately after the above-mentioned two working periods, the output of the counters 13 and 14 is produced one timing later, and the 4th digit of the register 11 and the 7th digit of the register 12 are selected. By repeating the same operation in the following, whole digits of the register 11 and the register 12 are successively selected one by one.

Figure 3:
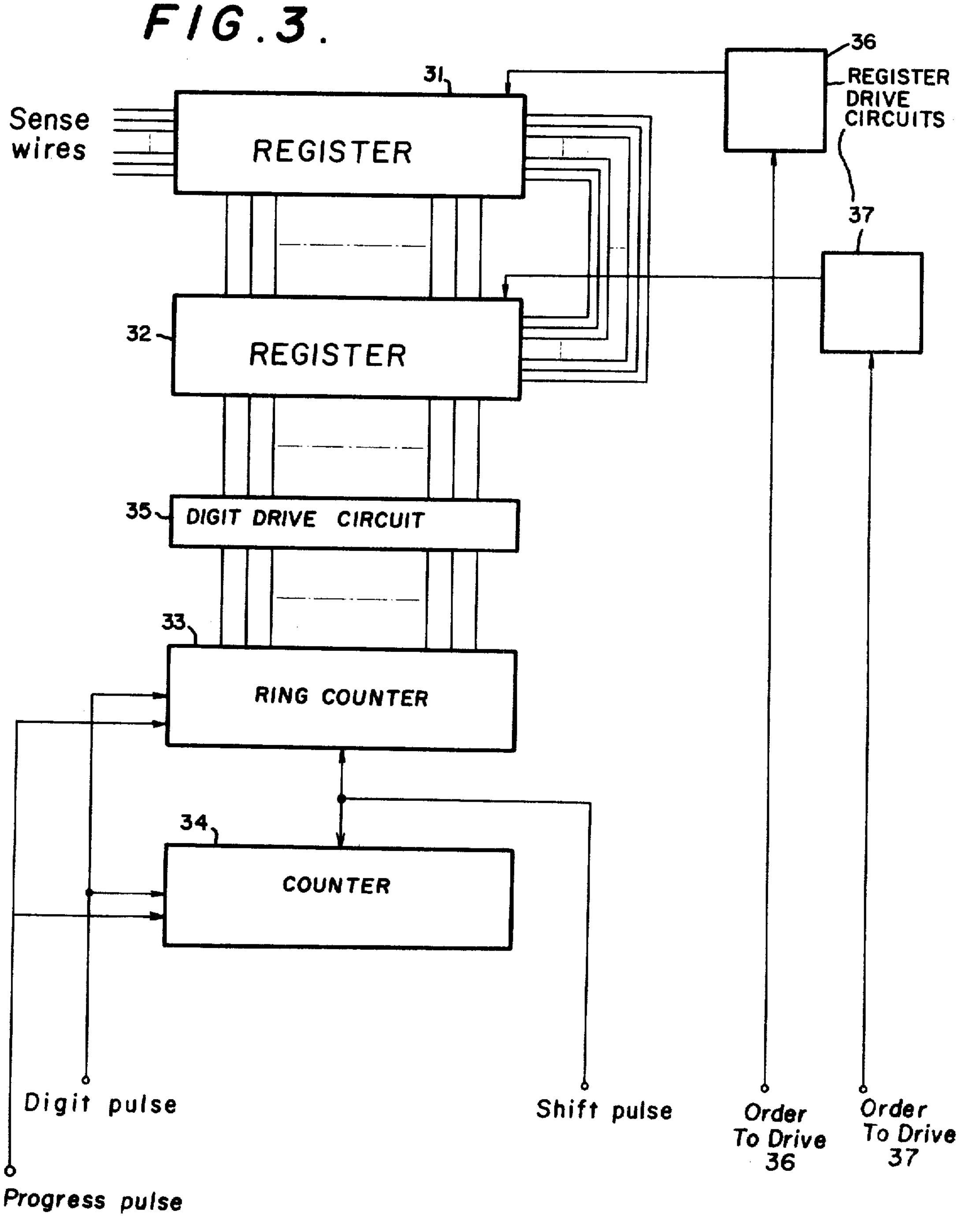
FIG. 3 is a block diagram showing another dynamic controlling method of the present invention.

Referring now again to the drawings, and more particularly to FIG. 3, another method of the invention is illustrated, wherein one counter can be omitted and the reading out or writing in can be done during the time between a digit pulse and next digit pulse, i.e., from one timing pulse to the next pulse.

In the block diagram in FIG. 3, register 31 is connected to register 32 which is connected in turn to the digit drive circuit 35. A ring counter 33 is connected to the digit drive circuit 35. A counter 34 is provided. Register drive circuits 36 and 37, respectively, feed into the registers 31 and 32, respectively. In this circuit the selection of the registers 31 and 32 is carried out by the ring counter 33 and the counter 34, and the ring counter 33 and the counter 34 constitute a shift register with each other, and their contents can be changed by means of the shift pulse. Accordingly, the ring counter 33 and the counter 34 correspond to the counter 13 of FIG. 1 at one occasion, and to the counter 14 at another occasion. Moreover, the ring counter 33 is identical with the ring counter 15, shown in FIG. 1. At the 0 timing of the digit pulse, the ring counter 33 and the counter C.D.C. are set depending on the contents of the registers 31 and 32, and register drive circuits 36 and 37 are not driven by the outputs of the ring counter 33 and the counter 34, but by the order to drive for either the register drive circuit 36 or the register drive circuit 37. The order to drive for the register drive circuits 36 and 37 occurs once respectively between one digit timing, i.e., during the time between a digit pulse and next digit pulse. Consequently, the appointed digit in the appointed register is selected by the numerals of the ring counter 33 or the counter 34 at that time.

Figure 4:
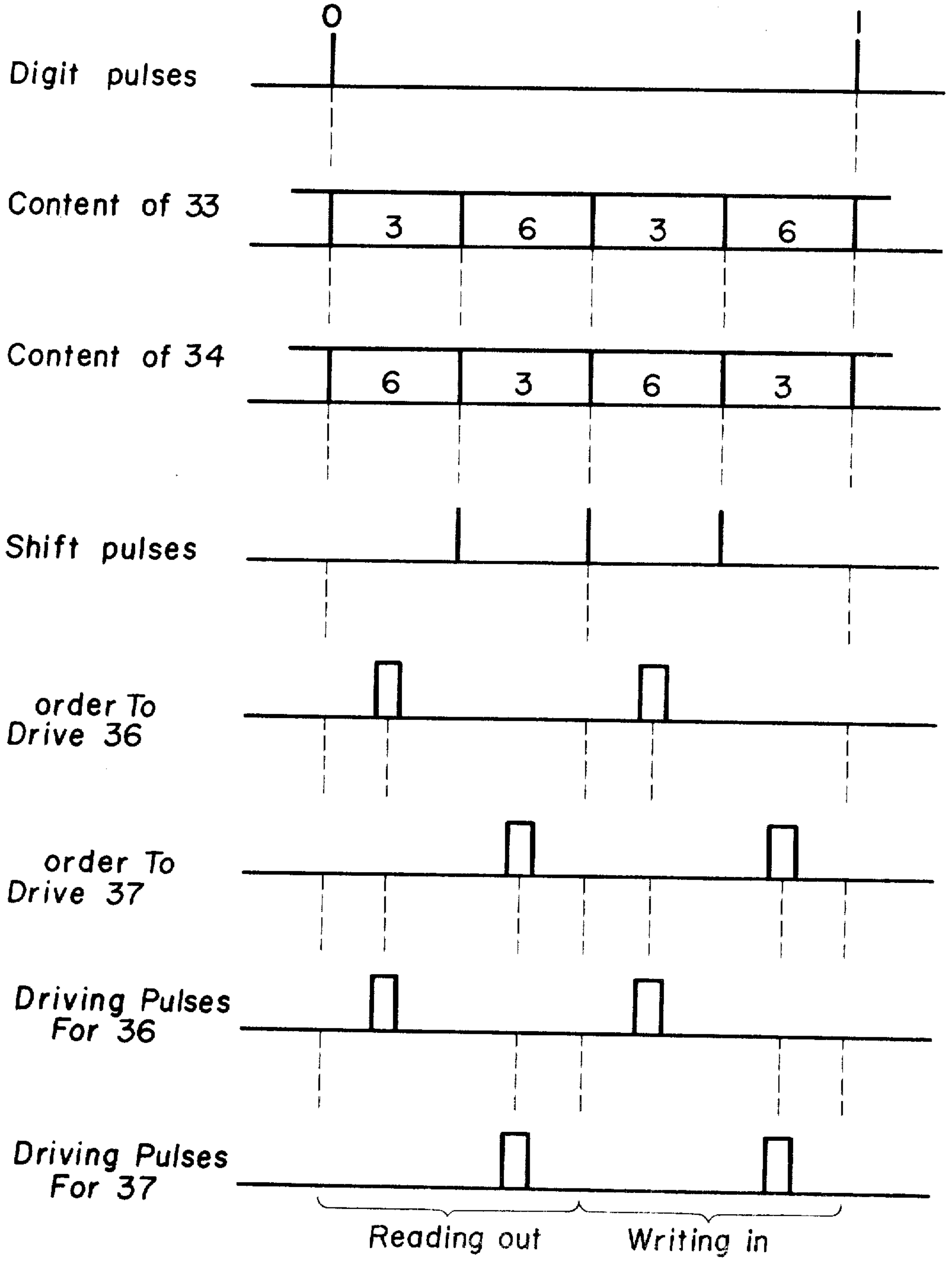
FIG. 4 is a time-chart in which the 3rd digit of one register and the 6th digit of the other register are appointed when the registers have eight units in FIG. 3.

Referring now again to the drawings, and more particularly to FIG. 4, this method will more clearly be understood. Now let us select, for example, that the contents of the ring counter 33 is 3 and the contents of the counter 34 is 6 at a certain timing of the digit pulse, and since the order to drive is given first to the register drive circuit 36, the 3rd digit of the register 31 is driven. Then the order to drive is given to register drive circuit 37. However, since the contents of the ring counter 33 and the counter 34 have been changed before that time driving the register drive circuit 37 by the shift pulse, and the ring counter 33 is 6 and the counter 34 is 3, the 6th digit of the register 32 is selected by the order to drive for the register drive circuit 37. Later, the contents of the ring counter 33 and the counter 34 are changed again by the shift pulse. In order to carry out the read-out and the writing, the operation is to be repeated twice. In this case, if one progress pulse in addition to the digit pulse are fed to the ring counter 33 and the counter 34 immediately after the completion of the first read-out and writing, the next digit is driven because the ring counter 33 and the counter 34 have become one digit ahead in excess at the timing when the order to drive is given to the register drive circuits 36 and 37.

The time-chart of this method is shown in FIG. 4, having 8 units in each of the registers 31 and 32, selecting the 3rd digit of the register 31 and the 6th digit of the register 32.

As compared with the method shown in FIG. 1, this method is complex in the pulse arrangement because of the shift pulse and the order to drive to be given to the register drive circuits 36 and 37 between one digit pulse and the other, but it has the advantage of a rapid arithmetic operation because of the working period against the two working periods needed for the read-out and the writing in the former method. Furthermore, in the case of arithmetic operations carried out successively digit by digit, whereas in the former method one digit of the counters 13 and 14 has to be ahead of the ring counter 15 every four working periods, in the latter method the ring counter 33 and the counter 34 already are one digit ahead automatically in the next digit pulse.

As described above, in the present invention the selecting and controlling of the digits of two or more registers can be carried out by means of simplified circuits, employing only one ring counter and one or two simple counters.

Since the methods for controlling the order to drive for the register drive circuits 17 and 18 and for setting the initial value of the counters are universally known and have no immediate relation to the present invention, the description about them is omitted.

What is claimed is:

1. A method for dynamic controlling of magnetic core registers in a calculating device such as desk calculators, comprising the steps of storing appointed values in at least two registers comprising a magnetic core matrix, separately selecting of each of said at least two registers by a corresponding separately provided register drive circuit, dynamic controlling of the digit selection by which the corresponding digits of said at least two registers are commonly driven by a common digit drive circuit, said appointed digit of said appointed register being selected, read out and written by the current coincidence method when said digit drive circuit and said register drive circuit operate at the same time, providing digit pulses having a constant period and a standard timing, carrying out the selecting of the digit drive circuit by one ring counter which proceeds at the same time with said digit pulses for selecting the digit, providing counters separately for each register for digit selecting, sending said digit pulses to said counters as an input, and operating said register drive circuit by the output produced by setting said counters to appoint the digit of said register at the appointed value at said standard timing of said digit pulses.

2. A method for dynamic controlling of magnetic core registers in a calculating device such as desk calculators, comprising the steps of storing appointed values in at least two registers comprising a magnetic core matrix, separately selecting of each of said at least two registers by a corresponding separately provided register drive circuit, dynamic controlling of the digit selection by which the corresponding digits of said at least two registers are commonly driven by a common digit drive circuit, said appointed digit of said appointed register being selected, read out and written by the current coincidence method when said digit drive circuit and said register drive circuit operate at the same time, providing digit pulses having a constant period and a standard timing, carrying out the selecting of the digit drive circuit by one ring counter, providing counters one less than the registers separately for appointing the digit, supplying shift pulses to said counters and said ring counter constituting shift registers to switch over the contents, supplying said digit pulses as input commonly to said counters and said ring counter, the contents of each counter being set at the appointed value at said standard timing of said digit pulse, shifting the content corresponding to the digit to be selected in the appointed register to the ring counter in an interval of two successive digit pulses, and subsequently selecting the appointed digit of the appointed register by driving said register drive circuit of the appointed register.

References Cited

UNITED STATES PATENTS

| | | | |
|---|---|---|---|
| 3,047,228 | 7/1962 | Bauer et al. | 340—172.5X |
| 3,200,379 | 8/1965 | King et al. | 340—172.5 |
| 3,293,616 | 12/1966 | Mullery et al. | 340—172.5 |
| 3,315,069 | 4/1967 | Böhm | 340—172.5X |
| 3,328,763 | 6/1967 | Rathbun et al. | 340—172.5 |
| 3,355,714 | 11/1967 | Culler | 340—172.5 |

L. J. HENON, Primary Examiner

R. F. CHAPURAN, Assistant Examiner